United States Patent
Shepherd, Jr.

[15] 3,669,990

[45] June 13, 1972

[54] HETEROCYCLIC ORGANO-ALUMINUM COMPOUNDS AND THEIR PREPARATION

[72] Inventor: Lawrence H. Shepherd, Jr., Baton Rouge, La.

[73] Assignee: Ethyl Corporation, New York, N.Y.

[22] Filed: Dec. 31, 1969

[21] Appl. No.: 889,740

[52] U.S. Cl. ............... 260/340.6, 260/448 A, 260/448 AD, 260/632
[51] Int. Cl. ........................................................ C07d 15/10
[58] Field of Search ......... 260/448 A, 448 AD, 340.6, 340.9, 260/345.1

[56] References Cited

UNITED STATES PATENTS

| | | | |
|---|---|---|---|
| 3,151,140 | 9/1964 | Hubel et al. | 260/448 A X |
| 3,260,730 | 7/1966 | Hubel et al. | 260/448 A X |
| 3,426,052 | 2/1969 | Hubel et al. | 260/429 |
| 3,444,226 | 5/1969 | Schmank et al. | 260/448 AD |

FOREIGN PATENTS OR APPLICATIONS

| | | | |
|---|---|---|---|
| 1,006,338 | 9/1965 | Great Britain | 240/448 A |

*Primary Examiner*—Tobias E. Levow
*Assistant Examiner*—H. M. S. Sneed
*Attorney*—Donald L. Johnson

[57] ABSTRACT

Organoaluminum compounds possessing an alumina-2-oxa-cyclo-oct-4-ene moiety having a vinylic substituent in the seven position are described. These are prepared by reacting an oxacyclopent-3-ene with a nonionic organoaluminum compound possessing an aluminacyclopent-3-ene moiety, preferably in the presence of a stable Lewis Base. The compound possessing the aluminacyclopent-3-ene moiety may be used in preformed condition or it may be formed in situ during the course of a one-step reaction. The compounds possessing the 7-vinylic alumina-2-oxacyclooct-4-ene moiety yield novel alkadienols on hydrolysis.

21 Claims, No Drawings

HETEROCYCLIC ORGANO-ALUMINUM COMPOUNDS AND THEIR PREPARATION

This invention relates to vinylic aluminum compounds, their synthesis and their use in the synthesis of alkadienols. More particularly, this invention relates to compounds in which an aluminum atom and an adjacent oxygen atom are part of an unsaturated ring system carrying a vinylic substituent.

BACKGROUND

In copending application Ser. No. 771,651, filed Oct. 29, 1968, it is shown that nonionic organoaluminum compounds possessing an aluminacycloalkene moiety are produced by causing interaction among aluminum, a conjugated diene and a hydrocarbon aluminum hydride in the presence of a Lewis base capable of complexing with the nonionic organoaluminum compound without undergoing excessive cleavage. For example, when the diene reactant is butadiene or butadiene substituted in the two position or in the two and three positions, the principal product produced is characterized by the formula:

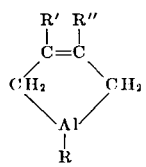

wherein R is a hydrocarbon group having up to about 18 carbon atoms, R' is a hydrogen, alkyl or alkenyl group; and R'' is a hydrogen or alkyl group.

Another process for preparing the foregoing nonionic organoaluminum compounds is described in copending application Ser. No. 822,046, filed May 5, 1969. In accordance with that process nonionic organoaluminum compounds possessing an aluminacycloalkene moiety are prepared by causing interaction among aluminum, a conjugated diene, an alkali metal aluminum tetrahydrocarbyl and hydrogen, the reaction being conducted in the presence of a Lewis base capable of complexing with the nonionic organoaluminum compound without undergoing excessive cleavage.

THE INVENTION

This invention involves, inter alia, the discovery that the aluminacycloalkene compounds referred to in the above-mentioned copending applications react with oxacyclopent-3-enes and thereby produce another class of cyclic aluminum compounds. Thus, by reacting an oxacyclopent-3-ene with a nonionic organoaluminum compound possessing an alumina-cyclopent-3-ene moiety a cleavage condensation reaction occurs, the result of which is the formation of an organoaluminum compound possessing an alumina-2-oxacyclooct-4-ene moiety having a vinylic substituent in the seven position. This process is preferably conducted in the presence of a stable Lewis base such as a tertiary amine, a dialkyl ether or a cycloparaffinic ether of the type referred to hereinafter.

The organoaluminum compounds of this invention may be depicted by the general formula:

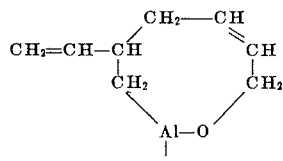

wherein each R group is, independently, hydrogen or a hydrocarbon group, e.g., alkyl, alkenyl, cycloalkyl, aryl, aralkyl, etc.; and R' is an organic group normally corresponding to that present in the organoaluminum reactant possessing the aluminacyclopent-3-ene moiety, e.g., a hydrocarbon group of up to about 18 carbon atoms, usually a lower alkyl group.

Synthesis of the compounds of this invention proceeds in accordance with the equation:

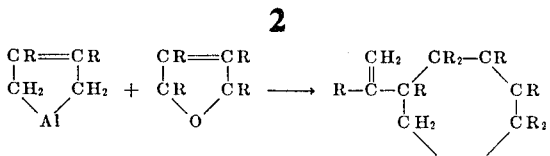

wherein each R group is, independently, hydrogen or a hydrocarbon group, e.g., alkyl, alkenyl, cycloalkyl, aryl, aralkyl, etc.; and al is two-thirds of a chemical equivalent of aluminum.

It is not necessary to preform the aluminacycloalkene reactant prior to introducing the oxacyclopent-3-ene reactant into the reaction system. If desired, the nonionic organoaluminum compound may be formed in situ in the course of a one-step operation whereby as the aluminacycloalkene moiety is formed it reacts with the oxacyclopent-3-ene to produce the cyclic aluminum compounds of this invention. This may be accomplished, for example, by effecting reaction among aluminum (preferably activated aluminum), a conjugated diene (preferably butadiene or butadiene substituted on one or both of its internal carbon atoms with a hydrocarbon group), a hydrocarbon aluminum hydride, and an oxacyclopent-3-ene. Although this reaction is preferably conducted in the presence of a stable Lewis base, i.e., a Lewis base which is not appreciably cleaved during the course of the reaction and which has the ability of forming complexes with organoaluminum compounds--it is feasible to perform the reaction in an excess of the oxacyclopent-3-ene reactant being employed.

As is evident from the general formula presented above, the cyclic organoaluminum compounds of this invention possess an alumina-2-oxacyclooct-4-ene moiety having a vinylic substituent in the seven position. For example, when the initial organoaluminum reactant contains an unsubstituted alumina-cyclopent-3-ene moiety (or when the diene reactant in a one-step process is butadiene) and when the oxacyclopent-3-ene is 2,5-dihydrofuran the resultant organoaluminum compound will contain the 7-vinyl alumina-2-oxacyclooct-4-ene moiety (i.e., the 7-vinyl-1-alumina-2-oxacyclooct-4-en-1 radical):

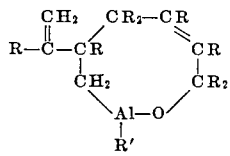

In other words, two-thirds of a chemical equivalent of aluminum is directly involved in forming a monoolefinic ring system having an oxygen atom adjacent to the aluminum atom, the ring itself carrying a vinylic substituent in the penultimate position (relative to the aluminum atom). The remaining valence bonding of the aluminum atom apparently carries, at least for the most part, a hydrocarbon group corresponding to that present in the hydrocarbon aluminum hydride used in synthesizing the aluminacycloalkene reactant. For all practical purposes the identity of the organic group satisfying the third bond of the aluminum atom is of but academic interest inasmuch as the above depicted ring system itself is by far the most novel and most useful segment of the over-all molecule. Since it is desirable to utilize diisobutylaluminum hydride in the synthesis of the compounds, the third bond of the aluminum atom will frequently be satisfied by an isobutyl group. However, other hydrocarbon groups, e.g., those having up to about 18 carbon atoms or more may be present.

There is a marked tendency for the cyclic aluminum compounds of this invention to form complexes with Lewis bases such as amines, ethers, thioethers and the like. These complexes, especially when the Lewis base is a tertiary amine, a dialkyl ether, a cycloparaffinic monoether having the oxygen atom in a six-membered ring or a cycloparaffinic diether having the oxygen atoms in a five- or six-membered ring, constitute preferred embodiments of this invention.

The cyclic aluminum compounds of this invention are nonionic. They are usually soluble in conventional aliphatic and aromatic hydrocarbon solvents such as benzene.

The cyclic aluminum compounds of this invention may be readily hydrolyzed with water or with aqueous mineral acids or bases whereby alkadienols are produced. These dienic alcohols have the skeletal configurations of the 7-vinylic alumina-2-oxacyclooct-4-ene moiety being hydrolyzed. Although it is possible for double bond isomerization to occur during hydrolysis, it is not difficult to conduct this operation so that the double bonds remain in their same relative positions. As a general proposition, the milder the hydrolysis conditions, the less likely it is that such double bond isomerization will occur.

Accordingly, this invention provides also a process of preparing new and useful compounds, viz., hepta-2,6-dien-1-ols having one or two methyl groups in the five position. This is accomplished by hydrolyzing a cyclic organoaluminum compound of this invention under suitable reaction conditions.

In order to still further appreciate the practice and advantages of this invention, reference should be had to the following illustrative examples.

EXAMPLE I

1-Isobutyl-3-methylaluminacyclopent-3-ene dioxanate was prepared by heating activated aluminum powder with isoprene and diisobutylaluminum hydride in excess 1,4-dioxane at 150° C. for two hours. Thirty-three mmoles of the 1-isobutyl-3-methylaluminacyclopent-3-ene dioxanate was then heated at 150° C. for 1.5 hours with 15 ml 1 of 2,5-dihydrofuran in 40 ml 1,4-dioxane. Gas evolution analysis of a portion of the reaction product revealed that 17 mmoles of the 1-isobutyl-3-methylaluminacyclopent-3-ene remained unchanged. The remainder of the reaction mixture was then hydrolyzed with dilute aqueous HCl at 25° C. Distillation at reduced pressure resulted in the isolation of 2.0 grams of a product (42 percent yield) which boiled at 72° C. at 3.2 mm Hg. Analysis of this fraction by means of vapor phase chromatography, nuclear magnetic resonance, and infrared showed that approximately 90 percent was 5,6-dimethylhepta-2,6-dien-1-ol, the remainder of the fraction being composed mainly of 5,5-dimethylhepta-2,6-dien-1-ol. Accordingly, the reaction between the 1-isobutyl-3-methylaluminacyclopent-3-ene and the 2,5-dihydrofuran gave rise to the formation of the 7-isopropenylalumina-2-oxacyclooct-4-ene moiety (ca. 90 percent):

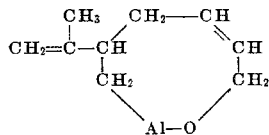

and the 7-vinyl-7-methylalumina-2-oxacyclooct-4-ene moiety (ca. 10 percent):

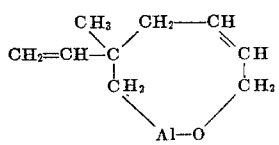

Each of these products was complexed with 1,4-dioxane and for the most part the third valence bond of the aluminum atom was satisfied by an isobutyl group.

EXAMPLE II

Reaction of activated aluminum metal (365 mmoles), isoprene (150 mmoles), diisobutylaluminum hydride (31 mmoles), and 150 mmoles of 2,5-dihydrofuran in 1,4-dioxane (1.23 moles) at 150° C. for 2 hours results in the formation of the alumina-2-oxacyclooct-4-ene moieties referred to in Example I. On hydrolysis, 5,6-dimethylhepta-2,6-dien-1-ol and 5,5-dimethylhepta-2,6-dien-1-ol are liberated in a ratio of approximately 9:1, respectively.

EXAMPLE III

Repetition of Example I with the exception that the isoprene is replaced in successive runs by butadiene, 2-ethyl butadiene, 2,3-dimethyl butadiene, and myrcene results in the formation of the following vinylic aluminaoxacycloalkene moieties, respectively:
7-vinyl alumina-2-oxacyclooct-4-ene;
7-(1-ethylvinyl)alumina-2-oxacyclooct-4-ene;
7-isopropenyl-7-methylalumina-2-oxacyclooct-4-ene; and
7-[1-(4-methylpent-3-enyl)vinyl]alumina-2-oxacyclo-oct-4-ene. Hydrolysis of these moieties liberates the following respective alkadienols:
5-methylhepta-2,6-dien-1-ol;
5-methyl-6-ethylhepta-2,6-dien-1-ol;
5,5,6-trimethylhepta-2,6-dien-1-ol; and
5-methyl-6-(4-methylpent-3-enyl)hepta-2,6-dien-1-ol.

EXAMPLE IV

Substitution of 2-methyl-2,5-dihydrofuran for the 2,5-dihydrofuran of Example II gives rise to the formation of 1,5,6-trimethylhepta-2,6-dien-1-ol as the major alkadienol. Thus, prior to hydrolysis the principal aluminaoxacycloalkene moiety in the reaction product is 7-isopropenyl-3-methylalumina-2-oxacyclooct-4-ene.

It may be helpful to further consider some additional details concerning the practice of this invention and its several embodiments.

Preformation of Nonionic Organoaluminum Compounds Possessing Aluminacycloalkene Moiety As noted above and in copending application Ser. No. 771,651, interaction among aluminum, a conjugated diene and a hydrocarbon aluminum hydride in the presence of a Lewis base capable of complexing with the resultant organoaluminum compound without undergoing excessive cleavage is one way by which nonionic organoaluminum compounds having the aluminacycloalkene moiety may be produced.

The diene reactant used in this process is preferably a conjugated diene hydrocarbon having from four to about 18 carbon atoms in the molecule, and is exemplified by such substances as butadiene, isoprene, 2,3-dimethyl butadiene, 2-ethyl butadiene, myrcene, 1,4-dimethyl butadiene, 1,4-diphenyl butadiene, 2-phenyl butadiene, alpha-phellandrene, and the like. Also, the diene may be substituted by innocuous radicals as in the case of chloroprene and 2,3-dichlorobutadiene. Dienes wherein the double bonds are in the terminal positions are usually most suitable.

The hydrocarbon aluminum hydride reactant used in the process may be a dihydrocarbyl aluminum hydride ($R_2AlH$) in which the R groups are hydrocarbyl groups (alkyl, aryl, cycloalkyl, alkenyl, aralkyl, alkaryl, etc.).

Thus, use may be made of such compounds as dimethylaluminum hydride, diethylaluminum hydride, dipropylaluminum hydride, dibutylaluminum hydride, diisobutylaluminum hydride, dioctylaluminum hydride, dioctadecylaluminum hydride, diphenylaluminum hydride, ditolylaluminum hydride, dicumenylaluminum hydride, dicyclohexylaluminum hydride, dimethylcyclohexylaluminum hydride, diallylaluminum hydride, dibenzylaluminum hydride, diphenethylaluminum hydride and the like. It is generally preferable to utilize a dialkylaluminum hydride, especially those having alkyl groups containing up to about 18 carbon atoms. The most preferred compounds are the dialkylaluminum hydrides in which each alkyl group is a lower alkyl group and thus contains up to about six carbon atoms. If desired, the hydrocarbon aluminum hydride may be generated in situ by initially reacting aluminum with trihydrocarbyl aluminum (e.g., triethylaluminum) under a hydrogen atmosphere according to known technology.

The aluminum used in the process may be in the form of chips, turnings, powder, or other similar particulated states. It is definitely preferable to employ activated aluminum. Methods for producing activated aluminum are standard and well known in the art. For further details, reference may be had, for example, to U.S. Pat. Nos. 2,885,314; 2,892,738; 2,921,876; 3,100,786; and 3,104,252.

This reaction is conducted in the presence of a Lewis base having suitable chemical stability under the reaction conditions being utilized. In most cases this Lewis base will be employed as the principal reaction solvent, i.e., the reaction will be conducted in the Lewis base selected for use. However, if desired, the reaction may be effected in a suitable inert hydrocarbon medium (e.g., paraffinic or aromatic hydrocarbon solvents such as hexane, heptane, octane, decane, cyclohexane, benzene, toluene, xylenes, and the like) provided a suitable amount of the Lewis base is also present in the reaction system. Ordinarily the system should contain at least 1–2 mols of Lewis base per mol of diene employed. Particularly convenient Lewis bases for use in the process are tertiary amines (e.g., trimethyl amine, dimethylethyl amine, triethyl amine, tributyl amine, triphenyl amine, tribenzyl amine, benzyldimethyl amine, N-methyl morpholine, N,N-diethyl aniline, N,N,N',N'-tetramethyl methylene diamine, N,N,N',N'-tetramethyl ethylene diamine, pyridine, N-methyl pyrrolidine, triethylene diamine, quinuclindine, and the like); dialkyl ethers (e.g., dimethyl ether, diethyl ether, diisopropyl ether, methylisoamyl ether, dibutyl ether, dihexyl ether and the like); cycloparaffinic monoethers having a six-membered ring (e.g., tetrahydropyran—pentamethylene oxide—and ring alkylated derivatives thereof); and cycloparaffinic diethers having a five- or six-membered ring (e.g., 1,4-dioxane, 1,3-dioxolane, 2-methyl-2-ethyl-1,3-dioxolane; and the like); and other similar substances which tend not to be excessively cleaved in the reaction, such as dicyclohexyl ether, dibenzyl ether, and the like.

The relative proportions of the reactants and reaction diluents do not appear to be critical as long as there is present a sufficient amount of each reactant to participate in the reaction.

In conducting the process for preforming the cyclic organoaluminum compounds for subsequent use in accordance with this invention, elevated temperatures are employed. Generally, temperatures within the range of about 100° C. to about 180° C. will be found satisfactory, temperatures within the range of about 130° to about 150° C. being preferred. Naturally one should select a reaction temperature at which excessive cleavage of the Lewis base does not occur.

Ordinarily the reaction will be conducted at atmospheric pressure or at the ambient pressures encountered when conducting the reaction in a closed reaction vessel. However, when using some of the lower boiling Lewis base solvents, e.g., dimethyl ether, trimethyl amine or the like, it is desirable to conduct the reaction at a high enough pressure to keep the system in the liquid state of aggregation. Thus, pressures up to about 50 atmospheres may be employed.

It will of course be understood that the reaction mixture should be kept essentially anhydrous and that exposure of the reaction system to air should be kept at a minimum.

The period of time during which the reactants interact with each other is susceptible to considerable variation and is generally discretionary. In general, the higher the reaction temperature, the shorter the reaction or contact time.

Exemplary of the compounds which may be preformed in the above manner are 1-isobutyl-3-methylaluminacyclopent-3-ene diethyl etherate; 1-isobutyl-3-methylaluminacyclopent-3-ene tetrahydropyranate; 1-isobutyl-3-methylaluminacyclopent-3-ene N-methylpyrrolidinate; 1-isobutyl-3-methylaluminacyclopent-3-ene dioxanate; 1-isobutyl-3-ethylaluminacyclopent-3-ene dioxanate; 1-isobutylaluminacyclopent-3-ene dioxanate; 1-isobutyl-3-(4-methyl-3-pentenyl)-aluminacyclopent-3-ene dioxanate; 1-ethyl-3-methyl-aluminacyclopent-3-ene dioxanate; 1-phenyl-3-methylaluminacyclopent-3-ene dioxanate; and the like.

Reaction of Oxacyclopent-3-enes with Preformed Nonionic Organoaluminum Compounds Possessing an Aluminacycloalkene Moiety Any of a wide variety of oxacyclopent-3-enes may be used in forming the novel products of this invention. In other words, any such compound coreactive with (i.e., capable of cleaving at the ether oxygen atom and adding to) the aluminacycloalkene moiety is suitable. Exemplary oxacyclopent-3-enes include 2-methyl-2,5-dihydrofuran; 3-methyl-2,5-dihydrofuran; 2-ethyl-2,5-dihydrofuran; 2-octyl-2,5-dihydrofuran; 2,5-dimethyl-2,5-dihydrofuran; 2,5-diphenyl-2,5-dihydrofuran; 2,2,5-trimethyloxacyclopent-3-ene; 2,3,4,5-tetramethyloxacyclopent-3-ene; and the like. The use of 2,5-dihydropyran is generally preferred.

The presence of substituents in the oxacyclopent-3-ene reactant is not prejudicial provided the substituents are sufficiently inert as not to interfere with its reactivity. Thus, the presence of innocuous substituents such as trimethylsilyl, triethylsilyl, triphenylsilyl, and like silane groups; halogen atoms, side chain ether oxygen atoms (e.g., methoxy, ethoxy, phenoxy, etc., groups) or thioether sulfur atoms may be found acceptable.

Reaction between the aluminacycloalkene moiety and the oxacyclopent-3-ene is preferably conducted in the presence of a Lewis base having suitable chemical stability under the reaction conditions being utilized. Thus, the use of Lewis bases of the character and in the manner referred to in Section A above will be found efficacious. For example (and as noted in Section A) the reaction may be conducted in a suitable inert hydrocarbon medium so long as a suitable amount of the appropriate Lewis base is also copresent. Ordinarily the system should contain at least one mole of Lewis base per molar equivalent of aluminacycloalkene moiety being subjected to the reaction.

For the reaction under discussion, reaction temperatures between about 50° C. and about 200° C. will usually suffice, temperatures falling in the range of from about 100° to about 175° C. being preferred. Naturally one will select a reaction temperature at which excessive cleavage of Lewis base (other than the oxacyclopent-3-ene) does not occur. Depending upon the reactants, reaction medium and temperature used, the pressure may range from atmospheric pressure or below up to about 100 atmospheres or more. The reactions will usually be conducted in a closed reaction system such as an autoclave. The usual precautions for reactions of this character should be observed, e.g., the system should be kept essentially anhydrous and exposure to the atmosphere should be kept at a minimum.

The proportions of the cycloalkene moiety and the oxacyclopent-3-ene coreactive therewith are susceptible to considerable variation inasmuch as the cleavage-addition reaction generally occurs on a 1:1 basis. Consequently, either reactant may be present in a considerable excess relative to the other reactant, or the reactants may be present in essentially equimolar proportions. In most cases, however, the oxacyclopent-3-ene will be used in excess relative to the aluminacycloalkene reactant.

In Situ Formation of Nonionic Organoaluminum Compounds Possessing Aluminacycloalkene Moiety and Concurrent Reaction of Oxacyclopent-3-enes Therewith As pointed out above, one way of accomplishing this one-step operation is to effect a reaction among aluminum, a conjugated diene, a hydrocarbon aluminum hydride, and the oxacyclopent-3-ene preferably, but not necessarily, in the presence of a stable Lewis base. This one-step process is, in effect, a combination of the preformation technology and the reaction technology discussed in detail under Sections A and B above, respectively. Thus, reference should be had to those sections for further details.

In passing, it should be noted that the temperature and pressure for this one-step procedure generally approximate the temperature and pressure when running the operation using preformed aluminacycloalkene moiety. Thus, one will normally choose the reaction temperatures and pressures discussed under Section B above.

Illustrative Uses for which the Vinylic Aluminaoxacycloalkene Moieties are Suited On hydrolysis, the novel cyclic aluminum compounds of this invention liberate alkadienols. The hydrolysis is preferably effected under mild conditions (e.g., using water, dilute mineral acid or moist air at low temperatures, e.g., 0°–25° C.). The hepta-2,6-dien-1-ols liberated on hydrolysis may be used as fragrance materials and thus may be used as perfumes in connection with household detergents, shampoos, toilet bars and the like. Some of the dienols may be used either directly as, or as intermediates for the manufacture of germicides, insecticides, fungicides, insect repellants, waterproofing agents and plasticizers.

Another important use for the vinylic aluminaoxacycloalkene moiety containing compounds of this invention is to subject them to controlled oxidation with air, oxygen or air enriched with gaseous oxygen whereby a new class of polyoxygenated cyclic organoaluminum compounds is produced.

The vinylic aluminaoxacycloalkene compounds of this invention may also be used in forming catalyst systems to be employed in the same general fashion as the conventional Ziegler catalyst systems. By way of example, these cyclic organoaluminum compounds may be used in conjunction with conventional transition metal containing catalyst ingredients (e.g., the halides, alkoxides, or chelates of titanium, zirconium, vanadium and the like) in much the same way as alkyl aluminum compounds are now used. Polymers which may be produced in this manner include polyethylene, polypropylene, ethyl-propylene copolymers and terpolymers, poly-4-methylpentene-1, and other olefin polymers and synthetic rubbers or elastomers.

I claim:

1. An organoaluminum compound possessing an alumina-2-oxacyclooct-4-ene moiety having a vinylic substituent in the seven position, the moiety being attached by means of an aluminum-carbon bond to a hydrocarbon group of up to about 18 carbon atoms.

2. A compound according to claim 1 wherein said substituent is a vinyl group.

3. A compound according to claim 1 wherein said substituent is an isopropenyl group.

4. A compound according to claim 1 wherein said substituent is a 1-ethylvinyl group.

5. A compound according to claim 1 wherein said substituent is a 1-(4-methyl-pent-3-enyl)vinyl group.

6. A process of preparing organoaluminum compounds possessing an alumina-2-oxacyclooct-4-ene moiety having a vinylic substituent in the seven position which comprises reacting (i) a nonionic organoaluminum compound possessing an aluminacyclopent-3-ene moiety attached by means of an aluminum-carbon bond to a hydrocarbon group of up to about 18 carbon atoms with (ii) an oxacyclopent-3-ene.

7. The process of claim 6 conducted in the presence of a stable Lewis base.

8. The process of claim 6 conducted in the presence of a tertiary amine, a dialkyl ether, a cycloparaffinic monoether having a six-membered ring, or a cycloparaffinic diether having a five- or six-membered ring.

9. The process of claim 6 conducted in the presence of 1,4-dioxane.

10. The process of claim 6 wherein the oxacyclopent-3-ene is 2,5-dihydrofuran.

11. The process of claim 6 wherein said nonionic organoaluminum compound is formed in situ.

12. The process of claim 6 wherein said nonionic organoaluminum compound is formed in situ in the presence of a stable Lewis base.

13. A compound according to claim 1 complexed with a stable Lewis base selected from the group consisting of tertiary amines, dialkyl ethers, cycloparaffinic monoethers having a six-membered ring and cycloparaffinic diethers having a five- or six-membered ring.

14. An organoaluminum compound possessing an alumina-2-oxacyclooct-4-ene moiety having a vinylic substituent in the seven position, the moiety being attached by means of an aluminum-carbon bond to a lower alkyl group.

15. A compound according to claim 14 wherein said substituent is a vinyl group, an isopropenyl group, a 1-ethylvinyl group or a 1-(4-methyl-pent-3-enyl)vinyl group.

16. A compound according to claim 14 complexed with a stable Lewis base selected from the group consisting of tertiary amines, dialkyl ethers, cycloparaffinic monoethers having a six-membered ring and cycloparaffinic diethers having a five- or six-membered ring.

17. A compound according to Claim 14 wherein said substituent is a vinyl group, an isopropenyl group, a 1-ethylvinyl group or a 1-(4-methyl-pent-3-enyl)vinyl group and wherein said compound is complexed with a stable Lewis base selected from the group consisting of tertiary amines, dialkyl ethers, cycloparaffinic ethers having a six-membered ring and cycloparaffinic diethers having a five- or six-membered ring.

18. A compound according to claim 14 complexed with 1,4-dioxane.

19. A compound according to claim 14 wherein said substituent is a vinyl group, an isopropenyl group, a 1-ethylvinyl group or a 1-(4-methyl-pent-3-enyl)vinyl group and said lower alkyl group is an isobutyl group.

20. A process of preparing organoaluminum compounds possessing an alumina-2-oxacyclooct-4-ene moiety having a vinylic substituent in the seven position which comprises reacting an oxacyclopent-3-ene with a nonionic organoaluminum compound possessing an aluminacyclopent-3-ene moiety attached by means of an aluminum-carbon bond to a hydrocarbon group of up to about 18 carbon atoms, the reaction being performed in a stable Lewis base reaction medium at a temperature falling in the range of about 100° to about 175° C. at which excessive cleavage of the Lewis base does not occur, said Lewis base being a tertiary amine, a dialkyl ether, a cycloparaffinic monoether having a six-membered ring, or a cycloparaffinic diether having a five- or six-membered ring.

21. The process of claim 20 wherein said oxacyclopent-3-ene is 2,5-dihydrofuran, said hydrocarbon group is a lower alkyl group and said Lewis base is 1,4-dioxane.

* * * * *

PO-1050
(5/69)

UNITED STATES PATENT OFFICE
CERTIFICATE OF CORRECTION

Patent No. 3,669,990      Dated June 13, 1972

Inventor(s) Lawrence H. Shepherd, Jr.

It is certified that error appears in the above-identified patent and that said Letters Patent are hereby corrected as shown below:

Column 2, lines 1-5, the formulas are incorrect and should read --

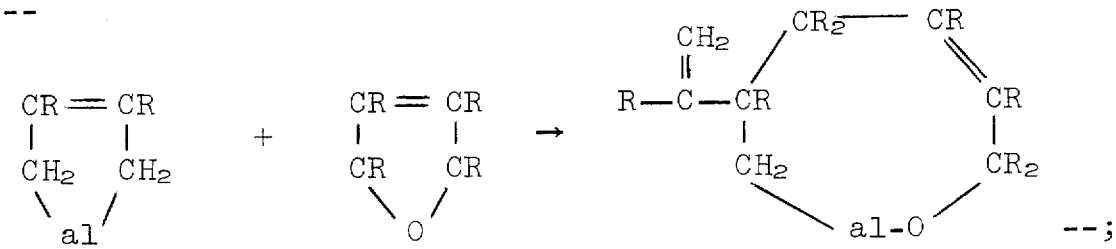

line 39 reads "-oxacycloct-4-en-1 radical):", should read -- -oxacycloct-4-en-1-yl radical): --. Column 3, line 29 reads "15 ml 1 of", should read -- 15 ml of --; line 52 reads "Al-O", should read -- al-O --; line 60 reads "Al-O", should read -- al-O --. Column 4, line 30 reads "Preformation", should read -- A. Preformation --. Column 6, line 1 reads "Reaction", should read -- B. Reaction --; line 60 reads "In situ", should read -- C. In Situ --. Column 7, line 3 reads "Illustrative", should read -- D. Illustrative --.

Signed and sealed this 5th day of December 1972.

(SEAL)
Attest:

EDWARD M. FLETCHER, JR.
Attesting Officer

ROBERT GOTTSCHALK
Commissioner of Patents